United States Patent
Kai et al.

(10) Patent No.: US 12,366,327 B2
(45) Date of Patent: Jul. 22, 2025

(54) GAS TANK AND METHOD OF MANUFACTURING THE SAME

(71) Applicant: TOYOTA JIDOSHA KABUSHIKI KAISHA, Toyota (JP)

(72) Inventors: Yuki Kai, Nagoya (JP); Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/318,077

(22) Filed: May 16, 2023

(65) Prior Publication Data

US 2023/0375133 A1 Nov. 23, 2023

(30) Foreign Application Priority Data

May 19, 2022 (JP) .................. 2022-082306

(51) Int. Cl.
*F17C 1/06* (2006.01)

(52) U.S. Cl.
CPC ........ *F17C 1/06* (2013.01); *F17C 2201/0109* (2013.01); *F17C 2203/012* (2013.01); *F17C 2203/0604* (2013.01); *F17C 2203/0624* (2013.01); *F17C 2203/0673* (2013.01); *F17C 2209/2109* (2013.01);
(Continued)

(58) Field of Classification Search
CPC ................ F17C 1/06; F17C 2201/0109; F17C 2203/012; F17C 2203/0604; F17C 2203/0624; F17C 2203/0673; F17C 2209/2109; F17C 2209/2154;
(Continued)

(56) References Cited

U.S. PATENT DOCUMENTS 7,195,133 B1   3/2007 Cundiff et al.
8,932,695 B1 * 1/2015 Villarreal .................. F17C 1/06
                                                           428/36.1
(Continued)

FOREIGN PATENT DOCUMENTS

CN   110822280 A   2/2020
CN   111503265 A   8/2020
(Continued)

OTHER PUBLICATIONS

Notice of Allowance issued to U.S. Appl. No. 18/316,186 on Feb. 13, 2025.

*Primary Examiner* — Don M Anderson
*Assistant Examiner* — Laura E. Parker
(74) *Attorney, Agent, or Firm* — Hunton Andrews Kurth LLP

(57) ABSTRACT

A gas tank comprises: a liner including a cylindrical body part, and a dome part, provided at each opposite ends of the body part; and a reinforcing layer covering an outer periphery of the liner. The reinforcing layer includes: at least one first fiber layer including a first reinforced section provided on an outer periphery of the body part, the first reinforced section being formed by winding fibers in such a manner that the fibers are interlaced with each other; and at least one second fiber layer including a second reinforced section provided on the outer periphery of the body part, the second reinforced section being formed by winding fibers at an angle determined in advance relative to a center axis of the liner.

9 Claims, 14 Drawing Sheets

(52) U.S. Cl.
CPC ...... *F17C 2209/2154* (2013.01); *F17C 2221/012* (2013.01); *F17C 2260/01* (2013.01); *F17C 2270/0168* (2013.01); *F17C 2270/0184* (2013.01)

(58) Field of Classification Search
CPC ............ F17C 2221/012; F17C 2260/01; F17C 2203/0663; F17C 2203/011; F17C 2203/0619
USPC ........................................................ 220/589
See application file for complete search history.

(56) References Cited

U.S. PATENT DOCUMENTS

| | | | | |
|---|---|---|---|---|
| 2009/0314785 | A1* | 12/2009 | Cronin | ................ B29C 53/602 |
| | | | | 156/305 |
| 2015/0192251 | A1* | 7/2015 | Tupper | ................ B29C 70/086 |
| | | | | 156/196 |
| 2018/0104916 | A1 | 4/2018 | Nishiwaki et al. | |
| 2020/0049312 | A1* | 2/2020 | Sawai | ................ F17C 1/02 |
| 2020/0072415 | A1 | 3/2020 | Kamiya et al. | |
| 2020/0247070 | A1 | 8/2020 | Katano | |
| 2021/0154953 | A1 | 5/2021 | Sawai | |
| 2021/0370577 | A1* | 12/2021 | Hatta | ................ B29C 53/602 |
| 2023/0375132 | A1* | 11/2023 | Kato | ................ F17C 1/06 |
| 2023/0375133 | A1 | 11/2023 | Kai et al. | |

FOREIGN PATENT DOCUMENTS

| | | | |
|---|---|---|---|
| CN | 112856210 | A | 5/2021 |
| DE | 102017206521 | A1 | 10/2018 |
| JP | 2006194332 | A | 7/2006 |
| JP | 2018179248 | A | 11/2018 |
| JP | 2018187775 | A | 11/2018 |
| JP | 2020026817 | A | 2/2020 |
| JP | 2021050433 | A | 4/2021 |
| JP | 2021187094 | A | 12/2021 |
| JP | 2022032231 | A * | 2/2022 |
| KR | 20200018223 | A | 2/2020 |
| WO | 2016074952 | A1 | 5/2016 |
| WO | 2020209034 | A1 | 10/2020 |

* cited by examiner

Fig.11

OUTSIDE TANK     TB1

| ELEVENTH LAYER (OUTERMOST LAYER) | FIRST FIBER LAYER |
|---|---|
| TENTH LAYER | SECOND FIBER LAYER |
| NINTH LAYER | FIRST FIBER LAYER |
| EIGHTH LAYER | SECOND FIBER LAYER |
| SEVENTH LAYER | FIRST FIBER LAYER |
| SIXTH LAYER | SECOND FIBER LAYER |
| FIFTH LAYER | FIRST FIBER LAYER |
| FOURTH LAYER | SECOND FIBER LAYER |
| THIRD LAYER | FIRST FIBER LAYER |
| SECOND LAYER | SECOND FIBER LAYER |
| FIRST LAYER (INNERMOST LAYER) | FIRST FIBER LAYER |
| LINER | |

INSIDE TANK

Fig.12

OUTSIDE TANK

| | TB2 | |
|---|---|---|
| ELEVENTH LAYER (OUTERMOST LAYER) | FIRST FIBER LAYER | |
| TENTH LAYER | SECOND FIBER LAYER | ST2 |
| NINTH LAYER | SECOND FIBER LAYER | |
| EIGHTH LAYER | SECOND FIBER LAYER | |
| SEVENTH LAYER | SECOND FIBER LAYER | |
| SIXTH LAYER | SECOND FIBER LAYER | |
| FIFTH LAYER | FIRST FIBER LAYER | ST1 |
| FOURTH LAYER | FIRST FIBER LAYER | |
| THIRD LAYER | FIRST FIBER LAYER | |
| SECOND LAYER | FIRST FIBER LAYER | |
| FIRST LAYER (INNERMOST LAYER) | FIRST FIBER LAYER | |
| LINER | | |

INSIDE TANK

GAS TANK AND METHOD OF MANUFACTURING THE SAME

CROSS REFERENCE TO RELATED APPLICATIONS

The present application claims priority from Japanese patent application P2022-082306 filed on May 19, 2022, the disclosure of which is hereby incorporated in its entirety by reference into the present application.

BACKGROUND

Field

The present disclosure relates to a gas tank and a method of manufacturing the same.

Related Art

There is a known gas tank with a vessel main body having an outer peripheral surface on which a fiber layer is stacked. The fiber layer includes a first reinforced section formed by winding reinforcing fibers in such a manner that the reinforcing fibers are interlaced with each other, and a second reinforced section formed by winding the reinforcing fibers helically and continuously from the first reinforced section (Japanese Patent Application Publication No. 2020-026817, for example). The gas tank is obtained by impregnating a thermosetting resin into the stacked fiber layer, and heating and hardening the resin.

In some cases, the thermosetting resin is not impregnated sufficiently into the second reinforced section formed by helically winding the reinforcing fibers as a result of high fiber density at the second reinforced section.

SUMMARY

According to one aspect of the present disclosure, a gas tank is provided. The gas tank comprises: a liner including a cylindrical body part and a dome part, wherein the dome part is arranged at each of opposite ends of the body part; and a reinforcing layer covering an outer periphery of the liner. The reinforcing layer includes: at least one first fiber layer including a first reinforced section provided on an outer periphery of the body part, the first reinforced section being formed by winding fibers in such a manner that the fibers are interlaced with each other; and at least one second fiber layer including a second reinforced section provided on the outer periphery of the body part, the second reinforced section being formed by winding fibers at a predetermined angle determined relative to a center axis of the liner.

According to the gas tank of this aspect, the provision of the second fiber layer allows increased strength of the fiber layer, leading to increase the strength of the gas tank. Furthermore, the provision of the first fiber layer allows a resin material to be improved impregnation performance into the fiber layer.

BRIEF DESCRIPTION OF THE DRAWINGS

FIG. 11 is an explanatory view schematically showing the configuration of a fiber-reinforced resin layer of the gas tank according to the first embodiment of the present disclosure;

FIG. 12 is an explanatory view schematically showing the configuration of a fiber-reinforced resin layer of a gas tank according to a second embodiment of the present disclosure;

DETAILED DESCRIPTION

A. First Embodiment

Figure 1:
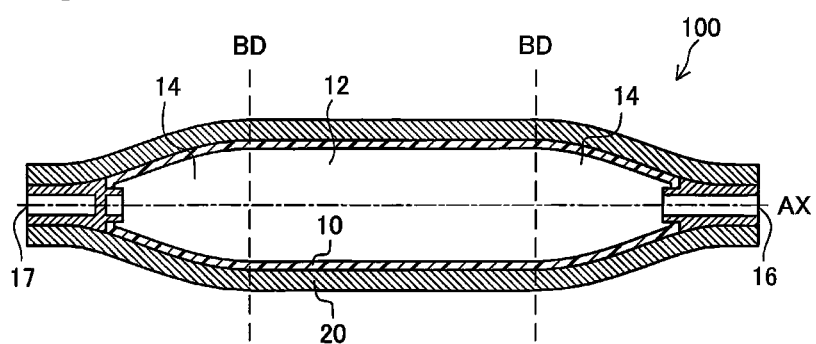
FIG. 1 is an explanatory view showing the configuration of a gas tank in a sectional view according to a first embodiment of the present disclosure.

FIG. 1 is an explanatory view showing the configuration of a gas tank 100 in a sectional view according to a first embodiment of the present disclosure. The gas tank 100 is a reservoir for storing a fluid of a high pressure from 10 to 70 Mpa. The gas tank 100 is formable into an arbitrary shape. In the example of FIG. 1, the gas tank 100 has an appearance of a substantial cylindrical shape extending long along the center axis AX.

The gas tank 100 is used for storing hydrogen gas to be supplied to fuel cells on vehicles, or as stationary fuel cells, for example. The gas tank 100 includes a liner 10, ferrules 16 and 17 arranged at opposite ends of the liner 10, and a fiber-reinforced resin layer 20 formed on respective outer peripheral surfaces of the liner 10 and the ferrules 16 and 17. The gas tank 100 may store not only hydrogen gas but also various types of fluids such as oxygen or natural gas.

The liner 10 is a vessel with internal space for sealing fluids therein. The liner 10 is made of resin with gas barrier properties such as nylon, polyamide, ethylene-vinyl alcohol copolymer (EVOH), polyethylene, polypropylene, epoxy, or polystyrene, for example. The liner 10 includes one cylindrical body part 12, and two hemispherical dome parts 14 arranged at opposite ends of the body part 12 along the center axis AX. The dome part 14 has a top provided with an opening. A boundary BD shown in FIG. 1 is a connection between the dome part 14 and the body part 12 of the liner 10 where an outer shape of the liner 10 has a curvature of zero. The liner 10 may be made of metal instead of resin. The shape of the body part 12 is not limited to a cylindrical shape but may be any prism shape with a polygonal cross-section.

The ferrules 16 and 17 are fitted to the openings provided at the respective tops of the dome parts 14 of the liner 10. The ferrule 16 is used for filling the gas tank 100 with gas or releasing gas from the gas tank 100, for example. The ferrule 17 is sealed and is used for centering during manufacture, for example.

The fiber-reinforced resin layer 20 is a reinforcing layer for reinforcing the liner 10. The fiber-reinforced resin layer 20 is formed using fiber-reinforced plastics (FRP) in such a manner as to cover an outer periphery of the liner 10. In the present embodiment, the fiber-reinforced resin layer 20 is formed by a so-called resin transfer molding (RTM) method. Specifically, a base with a fiber layer formed on the outer periphery of the liner 10 (also called a "fiber preform") is prepared and placed in a mold. The "fiber layer" means a layer formed by winding a fiber material. As described later, the fiber layer has a configuration with two types of fiber layers including a plurality of first fiber layers L1 and a plurality of second fiber layers L2 stacked in predetermined order in a thickness direction. The fiber material may be wound on outer surfaces of the ferrules 16 and 17 as well as on an outer surface of the liner 10.

In the present embodiment, carbon fibers are used as the fiber material. In addition to carbon fibers, the fiber material to be used may be glass fibers, aramid fibers, boron fibers, or high-strength polyethylene fibers, for example. Two or more of these fibers may be used in combination. The number of the fiber layers is from about 10 to 20, for example, and is arbitrarily settable in response to the size or shape of the gas tank 100. In the present embodiment, the number of the fiber layers is 11.

The mold with the base placed therein is closed and a resin material is filled into the closed mold at rapidly under high pressure, thereby impregnating the resin material into the fiber layer. During impregnation of the resin material, the interior of the base placed in the mold, namely, the interior of the liner 10 is filled with nitrogen gas, for example, in order to apply an internal pressure to withstand the external pressure applied from the resin material during the impregnation. The resin material impregnated into the fiber layer is hardened, thereby completing the gas tank 100.

Figure 2:
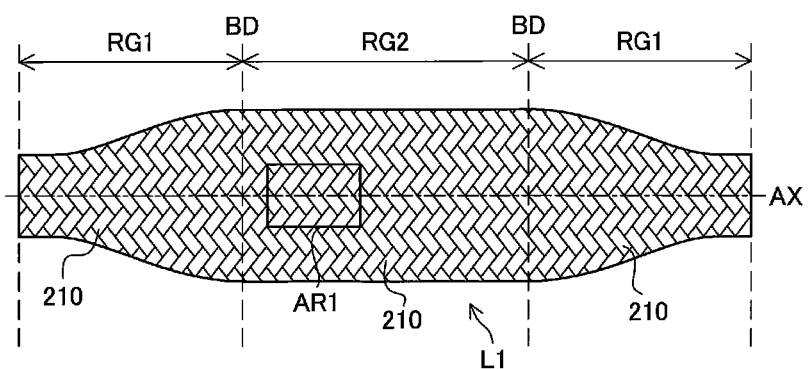
FIG. 2 is an explanatory view showing a base including a first fiber layer formed on an outer periphery of a body part.

FIG. 2 is an explanatory view showing the appearance of the base including the first fiber layer L1 formed on an outer periphery of the body part 12. The "first fiber layer" means a layer including a first reinforced section 210 provided in a range RG2 as the outer periphery of the body part 12. The "first reinforced section" is a section belonging to the fiber layer and formed by so-called braid winding. The "braid winding" means a method of winding fiber materials in such a manner that the fiber materials are interlaced with each other.

As shown in FIG. 2, in the present embodiment, the first fiber layer L1 includes the first reinforced section 210 provided further in a range RG1 as an outer periphery of the dome part 14 of the liner 10 in addition to the range RG2. Thus, the first fiber layer L1 includes the first reinforced section 210 extending over the outer periphery of the liner 10, entirely provided by forming the first reinforced section 210 across the range RG1 and the range RG2 continuously. The first fiber layer L1 is also called a "braid-wound layer" as it is formed by braid winding on the outer periphery of the liner 10 entirely.

Figure 3:
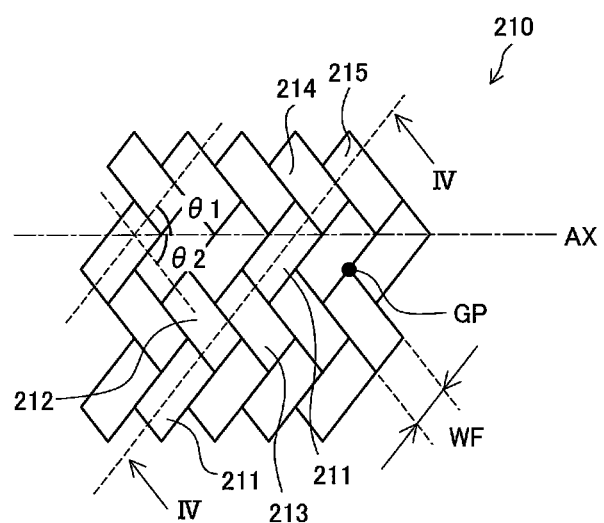
FIG. 3 is an explanatory view showing a partial range of first reinforced section in an enlarged manner.
Figure 4:
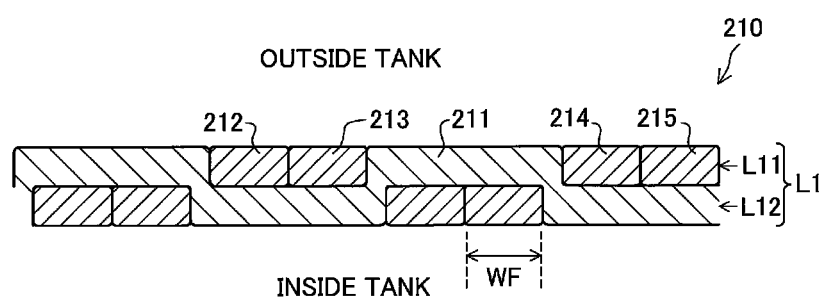
FIG. 4 is a sectional view taken along a position IV-IV in FIG. 3.

FIG. 3 is an explanatory view showing a partial range AR1 of the first reinforced section 210 in an enlarged manner. FIG. 4 is a sectional view taken along a position IV-IV in FIG. 3. As shown in FIGS. 3 and 4, the fiber material has a strip-shaped appearance having a predetermined width WF of about several millimeters, for example. However, the fiber material may have an arbitrary shape such as a filament shape or a flat-plate shape. The thickness of one fiber material is settable to an arbitrary thickness of equal to or less than 0.5 millimeters, for example. In the present embodiment, the thickness of one fiber material is 0.3 millimeters.

As shown in FIG. 3, a fiber material 211 is wound at an angle θ1 that is an elevation angle relative to the center axis AX of the liner 10. Fiber materials 212 to 215 are wound at an angle θ2 that is a depression angle relative to the center axis AX of the liner 10. The angles θ1 and θ2 are arbitrarily settable. Preferably, the angles θ1 and θ2 are set in consideration of stress acting on the body part 12 of the liner 10, for example. In the present embodiment, in order to obtain the gas tank 100 with sufficient strength, the angle θ1 is set to an angle around +54.7 degrees relative to the center axis AX, for example, and the angle θ2 is set to an angle around −54.7 degrees relative to the center axis AX, for example.

As shown in FIG. 4, the first reinforced section 210 is formed by interlacing the fiber material 211 and the fiber materials 212 to 215 with each other while changing the position of the fiber material 211 and those of the fiber materials 212 to 215 relative to each other alternately between an inner side and an outer side in a stacking direction. In the present embodiment, the relative position of the fiber material 211 is changed in units of two pieces of the fiber material. The first reinforced section 210 includes a layer L11 arranged on an outer side of the gas tank 100 and having a thickness corresponding to one piece of the fiber material, and a layer L12 arranged on an inner side of the gas tank 100 and having a thickness corresponding to one piece of the fiber material. The thickness of the first reinforced section 210 in one layer corresponds to the thicknesses of two pieces of the fiber material. In the following description, the number of the first fiber layers L1 is counted on condition that the layer L11 and the layer L12 in combination are defined as "one layer." In the present embodiment, the first reinforced section 210 has a thickness of 0.6 millimeters.

As shown FIG. 3, as the first reinforced section 210 is formed by interlacing a plurality of the fiber materials with each other, binding force acting between the fiber materials is higher than that obtained by helical winding. Thus, compared to a second reinforced section 220, for example, the first reinforced section 210 makes it possible to suppress defects of disturbed arrangement of the fiber material or defect of when the fiber material deviates from the intended arrangement position, due to slippage occurring during winding of the fiber material.

As shown FIG. 3, as the first reinforced section 210 is formed by interlacing a plurality of the fiber materials with each other, a gap GP may be generated between the wound fiber materials. This may cause the resin material to be impregnated easily at the first reinforced section 210, compared to a fiber layer composed of fiber materials that are appressed with each other formed by helical winding, for example.

Figure 5:
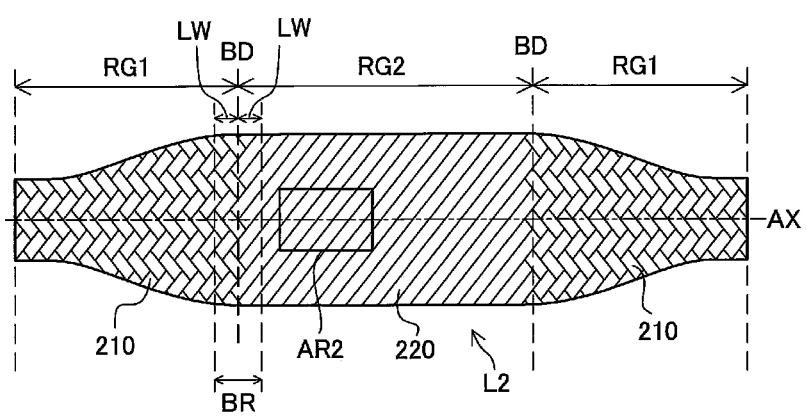
FIG. 5 is an explanatory view showing the base including a second fiber layer formed on the outer periphery of the body part.

FIG. 5 is an explanatory view showing the appearance of the base including the second fiber layer L2 formed on the outer periphery of the body part 12. The "second fiber layer" means a layer including the second reinforced section 220 provided in the range RG2. The "second reinforced section" is a section belonging to the fiber layer and formed by what is commonly known as helical winding. The "helical winding" means a method of winding a fiber material on the outer periphery of the body part 12 at an angle determined in advance relative to the center axis AX of the liner 10, and then winding the fiber material further at a different angle determined in advance relative to the center axis AX.

As shown in FIG. 5, in the present embodiment, the second fiber layer L2 includes the first reinforced section 210 in the range RG1. According to the gas tank 100 of the present embodiment, by forming the first reinforced section 210 on the outer periphery of the dome part 14 with curvature, it becomes possible to suppress defects where the fiber material deviates from the intended arrangement position, due to slippage, compared to when helical winding. On the condition that the gas tank 100 having sufficient strength is provided, the second fiber layer L2 may include the second reinforced section 220 in the range RG1 or may include only the second reinforced section 220 formed on the outer periphery of the body part 12 without the fiber layer in the range RG1.

In the second fiber layer L2, the first reinforced section 210 in the range RG1 and the second reinforced section 220 in the range RG2 are formed continuously. Specifically, after the first reinforced section 210 is formed in one of the ranges RG1, a method of winding the fiber material is switched to form the second reinforced section 220 in the range RG2 continuously from the first reinforced section 210. After the second reinforced section 220 is formed, the first reinforced section 210 is formed in the other range RG1 to complete the second fiber layer L2. As the second fiber layer L2 is formed by switching a method of winding the fiber material between the range RG1 and the range RG2, the second fiber layer L2 is also called a "switched wound layer."

As shown in the vicinity of a boundary BD in FIG. 5, from the viewpoint of arranging the fiber material regularly, a specific width might be generated in the axial direction from the start position of winding method switching to the end position of the winding method switching. Here, a "switching position of switching a fiber material winding method in the axis direction" means an intermediate position between the start position of winding method switching and the end position of the winding method switching for the fiber material in the axis direction. In the example of FIG. 5, the switching position of switching the winding method from the first reinforced section 210, to the second reinforced section 220 approximately coincides with the boundary BD. The "switching position of switching a fiber material winding method in the axis direction" may be given a predetermined tolerance width, set for allowing for manufacturing error or machine error, for example. In the present embodiment, the "switching position of switching a fiber material winding method in the axis direction" is set in such a manner that the switching position is covered in a boundary area BR having a distance LW, corresponding to the widths WF of two fiber materials, which is set as error in front of and behind the switching position in the axis direction.

Figure 6:
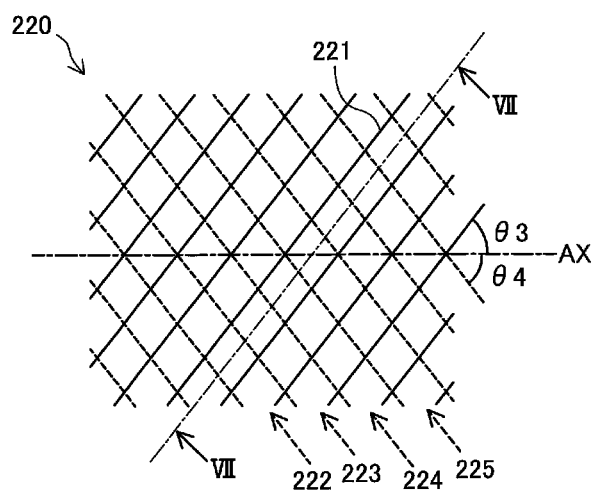
FIG. 6 is an explanatory view showing a partial range of the second reinforced section in an enlarged manner.

FIG. 6 is an explanatory view showing the appearance of the second reinforced section 220 in an enlarged manner. FIG. 6 shows a partial range AR2 in FIG. 5 in an enlarged manner. As shown in FIG. 6, a fiber material 221 is wound at an angle θ3 that is an elevation angle relative to the center axis AX of the liner 10. Fiber materials 222 to 225 are wound at an angle θ4 that is a depression angle relative to the center axis AX in such a manner as to be parallel to each other. The angles θ3 and θ4 are arbitrarily settable in consideration of stress acting on the body part 12 of the liner 10, for example. In the present embodiment, the angles θ3 and θ4 are determined in the same manner as the above-described angles θ1 and θ2 respectively.

Figure 7:
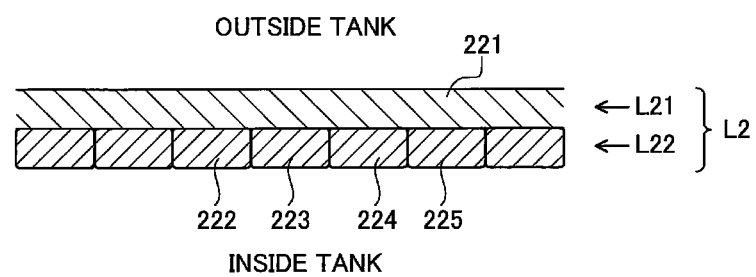
FIG. 7 is a sectional view taken along a position VII-VII in FIG. 6.

FIG. 7 is a sectional view taken along a position VII-VII in FIG. 6. As shown in FIG. 7, the second reinforced section 220 includes a layer L21 arranged on an outer side of the gas tank 100 such as the fiber material 221, and a layer L22 arranged on an inner side of the gas tank 100 such as the fiber materials 222 to 225. In the following descriptions, the number of the second fiber layers L2 is counted on condition that the layer L21 and the layer L22 in combination are defined as "one layer." In the present embodiment, the second reinforced section 220 has a thickness of 0.6 millimeters.

As shown in FIGS. 6 and 7, the second reinforced section 220 is formed by winding a plurality of the fiber materials by helical winding while the fiber materials are arranged parallel to each other to be appressed with each other. This provides higher density to the fiber materials than that of braid winding, thereby increasing the strength of the gas tank 100. As the fiber materials are appressed at the second reinforced section 220, impregnation of a resin material might be more difficult than at the first reinforced section 210 during filling the resin material under pressure employing the RTM method, for example.

Figure 8:
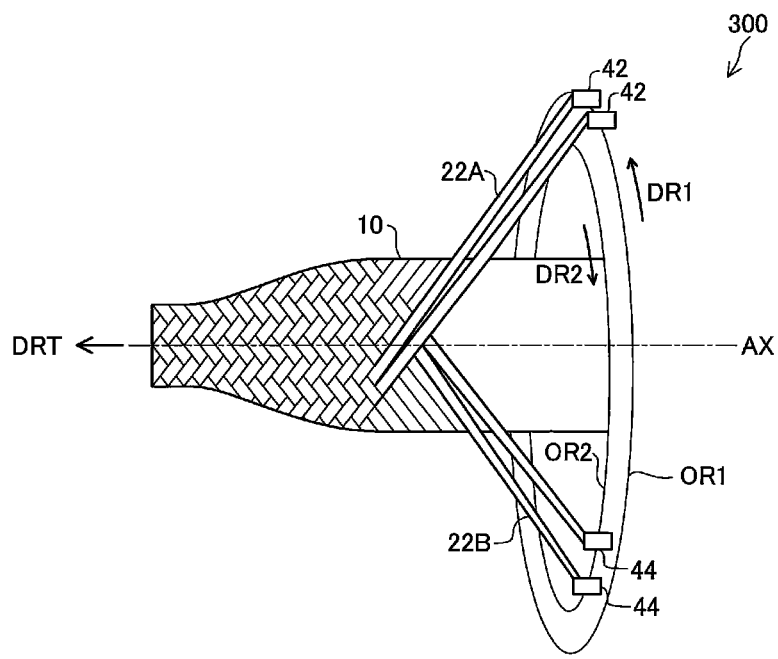
FIG. 8 is an explanatory view showing a schematic configuration of a manufacturing device for manufacturing the gas tank.

FIG. 8 is an explanatory view showing a schematic configuration of a manufacturing device 300 for manufacturing the gas tank 100. The manufacturing device 300 is a device for winding a fiber material on the liner 10. The manufacturing device 300 includes a first supplier 42 and a second supplier 44 for supplying the fiber material, and a movement mechanism not shown in the drawings for moving the liner 10 in a direction DRT. In FIG. 8, two first suppliers 42 and two second suppliers 44 are shown for the convenience of illustration. However, the number of the first suppliers 42 to be provided and that of the second suppliers 44 to be provided are each determined in response to the number of fiber materials to be actually wound.

The manufacturing device 300 rotates the first supplier 42 for feeding a fiber material 22A and the second supplier 44 for feeding a fiber material 22B along a movement path OR1 and a movement path OR2 around the liner 10 respectively. The manufacturing device 300 wounds the fiber materials 22A and 22B on the outer periphery of one of the dome parts 14, on the outer periphery of the body part 12, and on the outer periphery of the other dome part 14 of the liner 10 in this order while moving the liner 10 in the direction DRT congruent to the axis direction.

The manufacturing device 300 makes each of the movement paths OR1 and OR2 switchable to a path differing between the case of helical winding and the case of braid winding. The movement paths OR1 and OR2 shown in the example of FIG. 8 are paths for helical winding.

Figure 9:
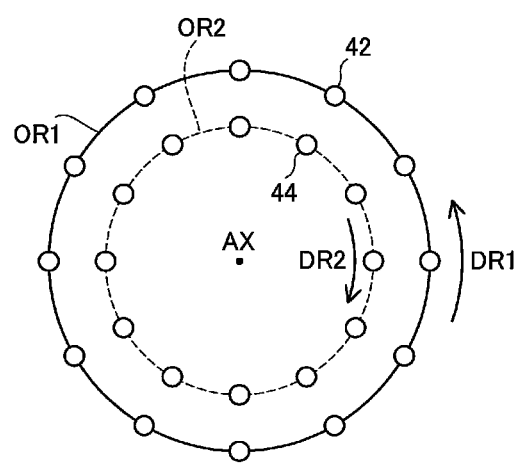
FIG. 9 is an explanatory view showing the respective movement paths for a first supplier and a second supplier responsive to helical winding.

FIG. 9 is an explanatory view showing the movement paths OR1 and OR2 for the first supplier 42 and the second supplier 44 respectively when performing helical winding. The movement path OR1 for the first supplier 42 is shown as a solid line and the movement path OR2 for the second supplier 44 is shown as a dashed line. The first supplier 42 and the second supplier 44 are arranged on the movement paths OR1 and OR2 respectively along two concentric circles surrounding the center axis AX, for example. The movement path OR1 is arranged at a position farther from the center axis AX than the movement path OR2, namely, arranged radially outwardly from the movement path OR2. The movement paths OR1 and OR2 are not limited to concentric circles but may be orbits of arbitrary shapes rotatable about the center axis AX.

As shown in FIG. 9, a movement direction DR1 for the first supplier 42 on the movement path OR1 and a movement direction DR2 for the second supplier 44 on the movement path OR2 are opposite to each other. As shown in FIG. 8, the second suppliers 44 rotating in the movement direction DR2 are used to wind a plurality of the fiber materials 22B on the outer periphery of the liner 10 at the angle θ4 that is a depression angle relative to the center axis AX. The first suppliers 42 rotating in the movement direction DR1 are used to wind a plurality of the fiber materials 22A externally on the fiber materials 22B at the angle θ3 that is an elevation angle relative to the center axis AX. As a result, the second reinforced section 220 with the layer L21 on an outer side and the layer L22 on an inner side is formed on the outer periphery of the body part 12.

Figure 10:
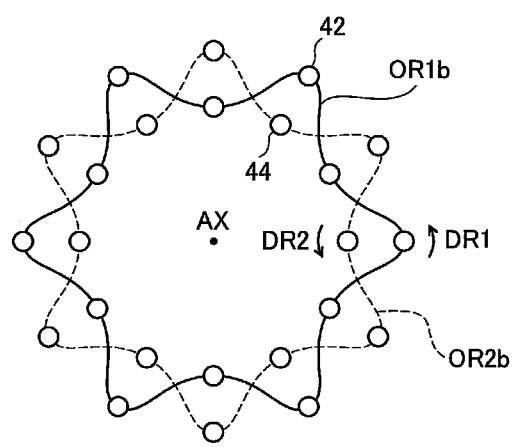
FIG. 10 is an explanatory view showing the respective movement paths for the first supplier and the second supplier responsive to braid winding.

FIG. 10 is an explanatory view showing a movement path OR1b and a movement path OR2b for the first supplier 42 and the second supplier 44 respectively when performing braid winding. To facilitate understanding of the technique, the movement path OR1b for the first supplier 42 is shown as a solid line and the movement path OR2b for the second supplier 44 is shown as a dashed line.

As shown in FIG. 10, the movement direction DR1 for the first supplier 42 on the movement path OR1b and the movement direction DR2 for the second supplier 44 on the movement path OR2b are opposite to each other. The movement paths OR1b and OR2b are alternately switched between a state where the first supplier 42 is arranged radially inwards and the second supplier 44 is arranged radially outwards and a state where the second supplier 44 is arranged radially inwards and the first supplier 42 is arranged radially outwards. By doing so, the fiber material 22B supplied at the angle θ2 that is a depression angle relative to the center axis AX and the fiber material 22A supplied at the angle θ1 that is an elevation angle relative to the center axis AX are wound on the outer periphery of the liner 10 in such a manner as to be interlaced with each other. As a result, the first reinforced section 210 with the layer L11 on an outer side and the layer L12 on an inner side is formed on the outer periphery of the body part 12.

The manufacturing device 300 allows the movement paths OR1, OR2 and the movement paths OR1b, OR2b to be switched from each other to coincide with desired timing relative to the liner 10 to move in the direction DRT. In the present embodiment, for forming the second fiber layer L2, the manufacturing device 300 performs braid winding on the outer periphery of one of the dome parts 14 along the movement paths OR1b and OR2b, then switches the movement paths OR1b and OR2b to the movement paths OR1 and OR2 at the boundary area BR shown in FIG. 2, and performs helical winding on the body part 12. The manufacturing device 300 switches the movement paths OR1 and OR2 to the movement paths OR1b and OR2b at the boundary area BR between the body part 12 and the other dome part 14, and performs braid winding on the other dome part 14. For forming the first fiber layer L1, the manufacturing device 300 performs braid winding on the liner 10 entirely without switching to the movement paths OR1 and OR2.

FIG. 11 is an explanatory view schematically showing the configuration of the fiber-reinforced resin layer 20 of the gas tank 100 according to the first embodiment of the present disclosure. A table TB1 in FIG. 11 corresponds to a sectional view of the fiber-reinforced resin layer 20 in the range RG2, and shows arrangement of the first fiber layer L1 and that of the second fiber layer L2 relative to each other in the stacking direction on the outer periphery of the body part 12 of the liner 10. A lowermost row in the table TB1 corresponds to the liner 10, and a section below the lowermost row shows the inner side of the gas tank 100. An uppermost row in the table TB1 shows an eleventh layer of the fiber-reinforced resin layer 20 and corresponds to an outermost layer. A fiber layer stacked on the outer surface of the liner 10 is also called an "innermost layer." On the assumption that the innermost layer is a first layer, layers from a second layer to a tenth layer are also called "inner layers."

As shown in FIG. 11, in the gas tank 100 of the present embodiment, the fiber-reinforced resin layer 20 includes the first fiber layer L1 with the first reinforced section 210 formed by braid winding and the second fiber layer L2 with the second reinforced section 220 formed by helical winding. The provision of the second fiber layer L2 increases the strength of the gas tank 100. The provision of the first fiber layer L1 causes the resin material to be impregnated easily into the fiber layer. Thus, it is possible to obtain the gas tank 100 acquiring balance between suppression of insufficient impregnation of the resin material and increase in strength.

In the gas tank 100 of the present embodiment, the first fiber layer L1 is arranged in the outermost layer of the fiber-reinforced resin layer 20. When the resin material is filled under pressure into the mold by the RTM method, the resin material at rapidly under high pressure collides with the fiber layer. This may cause defect such as disturbed arrangement of the fiber material or separation or lifting of the fiber material. By arranging the first fiber layer L1 having high binding force between the fiber materials in the outermost layer, it becomes possible to suppress or prevent defect such as disturbed arrangement of the fiber material or separation of the fiber material that occurs on the outer surface of the fiber layer due to collision from the resin material during impregnation of the resin material into the fiber layer.

In the gas tank 100 of the present embodiment, the first fiber layer L1 is arranged in the innermost layer of the fiber-reinforced resin layer 20. The innermost layer of the fiber-reinforced resin layer 20 is susceptible to influence caused by deformation of the liner 10 and density of the fiber material is likely to increase at the innermost layer compared to the fiber layer in the inner layer, for example. For this reason, it may be more difficult to impregnate the resin material into the innermost layer of the fiber-reinforced resin layer 20 than in other layers. This characteristic becomes notable, particularly if the liner 10 is made of resin. In the present embodiment, the first fiber layer L1, where the resin material is impregnated easily is arranged as the innermost layer of the fiber-reinforced resin layer 20. This makes it possible to suppress or prevent insufficient impregnation of the resin material into the innermost layer.

In the gas tank 100 of the present embodiment, the fiber-reinforced resin layer 20 includes an alternately stacked section. The "alternately stacked section" means a fiber layer including a plurality of the first fiber layers L1 and a plurality of the second fiber layers L2 where the first fiber layers L1 and the second fiber layers L2 are stacked alternately. In the present embodiment, the first fiber layers L1 and the second fiber layers L2 are stacked alternately one by one. However, this is not the only configuration but the first fiber layers L1 and the second fiber layers L2 may be stacked alternately in units of a predetermined number of layers such as two or more. The alternately stacked section may be incorporated in any part of the fiber-reinforced resin layer 20. For example, the alternately stacked section may be provided only in the inner layer or may include at least one of the innermost layer and the outermost layer. In the present embodiment, the alternately stacked section is formed across the all layers from the innermost layer to the outermost layer. According to the gas tank 100 of the present embodiment, by alternately arranging the fiber layers formed by winding the fiber material using methods differing between the fiber layers, it becomes possible to suppress non-uniformity of the entire shape of the fiber-reinforced resin layer 20 and to suppress or prevent reduction in the strength of the gas tank 100.

In the gas tank 100 of the present embodiment, the fiber-reinforced resin layer 20 is set in such a manner that a total value of the thicknesses of the second fiber layers L2 is equal to or less than five millimeters. This value is obtained experimentally using a manufacturing device for manufacturing the gas tank 100 employing the RTM method by the present inventors by determining a relationship between the thickness of the second fiber layer L2 incorporated in the fiber-reinforced resin layer 20 and the performance of impregnation of the resin material. Specifically, a plurality of samples of the base having respective thicknesses of the second fiber layer L2 was prepared. The samples were placed in a mold of the manufacturing device. Using two-component epoxy resin as a resin material, the resin material was impregnated into a fiber layer of each of the samples by filling under pressure of about 5 to 10 MPa. As a result, in a sample where the resin material was impregnated successfully into an innermost layer of the fiber layer, a maximum thickness of the second fiber layer L2 was five millimeters. In the present embodiment, however, to impregnate the resin material more reliably, a total number of the second fiber layers L2 is set equal to or less than five. As a result, a total of the thicknesses of the second fiber layers L2 becomes equal to or less than 3.0 millimeters. The gas tank 100 of the present embodiment makes it possible to impregnate the resin material more reliably into the innermost layer during filling of the resin material under pressure employing the RTM method.

As shown in FIG. 11, in the gas tank 100 of the present embodiment, the fiber-reinforced resin layer 20 is set to include six first fiber layers L1 and five second fiber layers L2. Namely, the number of the first fiber layers L1 is set larger than that of the second fiber layers L2 in the fiber-reinforced resin layer 20. This allows the resin material to be impregnated more reliably into the fiber layer.

B. Second Embodiment

FIG. 12 is an explanatory view schematically showing the configuration of the fiber-reinforced resin layer 20 of the gas tank 100 according to a second embodiment of the present disclosure. The configuration of a table TB2 shown in FIG. 12 will not be described as it is similar to that of the table TB1 shown in FIG. 11.

Like in the first embodiment, in the gas tank 100 of the second embodiment, the fiber-reinforced resin layer 20 includes the first fiber layer L1 and the second fiber layer L2. Thus, it is possible to obtain the gas tank 100 acquiring balance between suppression of insufficient impregnation of a resin material and strength. Furthermore, a total value of the thicknesses of the second fiber layers L2 is equal to or less than 3.0 millimeters to allow the resin material to be impregnated more reliably into an innermost layer. Moreover, in order to reduce or prevent the occurrence of insufficient impregnation of the resin material into the innermost layer, the first fiber layer L1 is arranged in the innermost layer of the fiber-reinforced resin layer 20. In order to suppress or prevent disturbed arrangement of a fiber material or separation of the fiber material, etc. on an outer surface of the fiber layer, the first fiber layer L1 is arranged in an outermost layer of the fiber-reinforced resin layer 20.

As shown in the table TB2, in the present embodiment, the fiber-reinforced resin layer 20 includes a first continuously stacked section ST1 with a plurality of the first fiber layers L1 stacked continuously and a second continuously stacked section ST2 with a plurality of the second fiber layers L2 stacked continuously. By continuously arranging the fiber layers continuously formed by winding the fiber material using a method and arranging the fiber layers formed by winding the fiber material using a different method, it becomes possible to reduce the number of times a method of winding the fiber material is switched. This achieves improved productivity of the gas tank 100.

As shown in the table TB2, in the gas tank 100 of the second embodiment, the first continuously stacked section ST1 is composed of the first fiber layers L1 stacked continuously from the innermost layer to a fifth layer, and the second continuously stacked section ST2 is composed of the second fiber layers L2 stacked continuously from a sixth layer to a tenth layer. In the fiber-reinforced resin layer 20 of the present embodiment, the first continuously stacked section ST1 is arranged on an inner layer side relative to the second continuously stacked section ST2. The first fiber layers L1 where the resin material is impregnated easily are arranged intensively on the inner layer side. This makes it possible to improve the performance of the impregnation on the inner layer side where impregnation of the resin material is more difficult than on an outer layer side.

C. Other Embodiments (C1) In the above-described first embodiment, the first fiber layer L1 includes the first reinforced section 210 provided in both the ranges RG1 and RG2 as the outer peripheries of the dome part 14 and the body part 12 of the liner 10 respectively. By contrast, on the condition that the first fiber layer L1 includes the first reinforced section 210 in the range RG2, the first fiber layer L1 may include a fiber layer in the range RG1 such as the second reinforced section 220, for example, formed by a method other than the method of forming the first reinforced section 210.

(C2) As shown in FIG. 11, in the above-described first embodiment, the number of the first fiber layers L1 incorporated in an intermediate position of the fiber-reinforced resin layer 20, and on an inner layer side, relative to the intermediate position, is equal to the number of the first fiber layers L1 incorporated on an outer layer side, relative to the intermediate position. The "intermediate position of the fiber-reinforced resin layer 20" means an intermediate position of the fiber-reinforced resin layer 20 in the stacking direction. If the fiber-reinforced resin layer 20 includes an odd number of fiber layers, the "intermediate position of the fiber-reinforced resin layer 20" covers an intermediate fiber layer determined from the number of the stacked layers of the fiber-reinforced resin layer 20. If the fiber-reinforced resin layer 20 includes an even number of fiber layers, the "intermediate position of the fiber-reinforced resin layer 20" means a boundary between two fiber layers located at intermediate positions determined from the number of the stacked layers of the fiber-reinforced resin layer 20. In the example of FIG. 11, the intermediate position of the fiber-reinforced resin layer 20 corresponds to a sixth layer. If the fiber-reinforced resin layer 20 includes 12 fiber layers, for example, an intermediate layer corresponds to a boundary between the sixth layer and a seventh layer.

Meanwhile, the number of the first fiber layers L1 incorporated in an intermediate layer of the fiber-reinforced resin layer 20 and on inner layers relative to the intermediate layer may be larger than that of the first fiber layers L1 incorporated on an outer layer side. According to the gas tank 100 of this embodiment, by arranging a large number of the first fiber layers L1 on the inner layer side where impregnation of the resin material is more difficult than on the outer layer side, it becomes possible to impregnate the resin material more reliably into the innermost layer.

Figure 13:
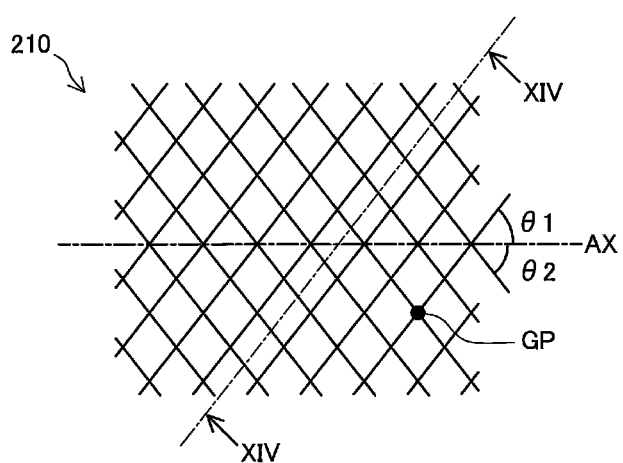
FIG. 13 is an explanatory view showing another embodiment of the first reinforced section.
Figure 14:
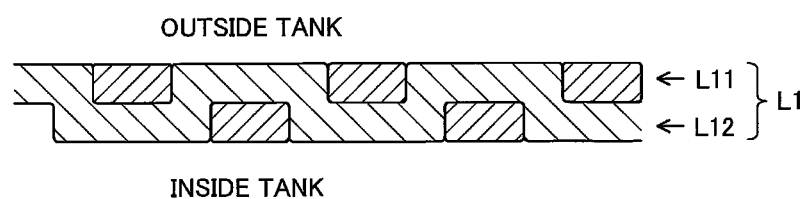
FIG. 14 is a sectional view taken along a position XIV-XIV in FIG. 13.

(C3) FIG. 13 is an explanatory view showing another embodiment of the first reinforced section 210. FIG. 14 is a sectional view taken along a position XIV-XIV in FIG. 13. In the example given in each of the above-described embodiments, the first reinforced section 210 is formed by winding fiber materials in such a manner that the fiber materials are interlaced with each other in units of two. By contrast, as shown in FIGS. 13 and 14, the first reinforced section 210 may be formed by winding fiber materials in such a manner that the fiber materials are interlaced with each other one by one.

(C4) In the example given in the above-described second embodiment, the first continuously stacked section ST1 is arranged on the inner layer side relative to the second continuously stacked section ST2. By contrast, the second continuously stacked section ST2 may be arranged on the inner layer side relative to the first continuously stacked section ST1. According to the gas tank 100 of this embodiment, providing a large number of the second fiber layers L2 on the inner layer side makes it possible to increase the strength of the gas tank 100.

The present disclosure is not limited to the embodiments described above and is able to be realized with various configurations without departing from the spirit thereof. For example, technical features in the embodiments are able to be replaced with each other or combined together as necessary in order to solve part or the whole of the problems described previously or to achieve part or the whole of the effects described previously. When the technical features are not described as essential features in the present specification, they are able to be deleted as necessary. For example, the present disclosure may be realized with embodiments which will be described below.

(1) According to one aspect of the present disclosure, a gas tank is provided. The gas tank comprises: a liner including a cylindrical body part and a dome part, wherein the dome part is arranged at each of opposite ends of the body part; and a reinforcing layer covering an outer periphery of the liner. The reinforcing layer includes: at least one first fiber layer including a first reinforced section provided on an outer periphery of the body part, the first reinforced section being formed by winding fibers in such a manner that the fibers are interlaced with each other; and at least one second fiber layer including a second reinforced section provided on the outer periphery of the body part, the second reinforced section being formed by winding fibers at a predetermined angle determined relative to a center axis of the liner.

According to the gas tank of this aspect, the provision of the second fiber layer allows increased strength of the fiber layer, leading to increase the strength of the gas tank. Furthermore, the provision of the first fiber layer allows a resin material to be improved impregnation performance into the fiber layer.

(2) In the gas tank of the above-described aspect, the first fiber layer may be arranged as the outermost layer of the reinforcing layer.

The gas tank of this aspect makes it possible to suppress or prevent disturbed arrangement of a fiber material on an outer surface of the fiber layer.

(3) In the gas tank of the above-described aspect, the first fiber layer may be arranged as the innermost layer of the reinforcing layer.

The gas tank of this aspect makes it possible to suppress or prevent insufficient impregnation of the resin material into the innermost layer, where impregnation of the resin material is difficult.

(4) In the gas tank of the above-described aspect, the reinforcing layer may include an alternately stacked section with the first fiber layer and the second fiber layer stacked alternately.

According to the gas tank of this aspect, by alternately arranging the fiber layers formed by winding the fiber material using methods differing between the fiber layers, it becomes possible to suppress non-uniformity of the entire shape of the reinforcing layer, and to suppress or prevent reduction in the strength of the gas tank.

(5) In the gas tank of the above-described aspect, the reinforcing layer may include: a first continuously stacked section with a plurality of the first fiber layers stacked continuously; and a second continuously stacked section with a plurality of the second fiber layers stacked continuously.

The gas tank of this aspect reduces the number of times the method to winding the fiber material is switched, thereby achieving improved productivity of the gas tank.

(6) In the gas tank of the above-described aspect, the first continuously stacked section may be arranged as an inner layer side relative to the second continuously stacked section, in the reinforcing layer.

According to the gas tank of this aspect, the first fiber layers, where the resin material is impregnated easily, are arranged intensively on the inner layer side. This makes it possible to improve the performance of the impregnation on the inner layer side, where impregnating the resin material is difficult than on an outer layer side.

(7) In the gas tank of the above-described aspect, the number of the first fiber layers incorporated in an intermediate position of the reinforcing layer, and on an inner layer side relative to the intermediate position may be greater than that of the first fiber layers incorporated on an outer layer side relative to the intermediate position.

According to the gas tank of this aspect, by arranging a large number of the first fiber layers on the inner layer side, where impregnating the resin material is difficult than on the outer layer side, it becomes possible to impregnate the resin material more reliably into the innermost layer.

(8) In the gas tank of the above-described aspect, a combined value of the thicknesses of the second fiber layers may be equal to or less than five millimeters.

The gas tank of this aspect makes it possible to impregnate the resin material with greater reliably into the innermost layer during filling of the resin material under pressure.

(9) In the gas tank of the above-described aspect, the number of the first fiber layers may be greater than that of the second fiber layers.

The gas tank of this aspect allows the resin material to be impregnated with greater reliably into the fiber layer.

(10) In the gas tank of the above-described aspect, the first fiber layer further may include the first reinforced section arranged on an outer periphery of the dome part. The second fiber layer further may include the first reinforced section arranged on an outer periphery of the dome part.

According to the gas tank of this aspect, by forming the first reinforced section on the outer periphery of the dome part with curvature, it becomes possible to suppress the defect of when the fiber material deviates from the intended arrangement position, compared to when forming the second reinforced section on the outer periphery of the dome part.

The present disclosure is feasible in various aspects other than a gas tank and as a method of manufacturing the gas tank. For example, the present disclosure may be realized in aspects including a method of forming a fiber-reinforced resin layer, a method of manufacturing fiber-reinforced plastics, a device for manufacturing fiber-reinforced plastics, a method of controlling a device for manufacturing a gas tank or a device for manufacturing fiber-reinforced plastics, a computer program realizing such a control method, and a non-transitory recording medium storing such a computer program.

What is claimed is:

1. A gas tank comprising:
  a liner including a cylindrical body part and a pair of dome parts, wherein each dome part is arranged at each of opposite ends of the body part; and
  a reinforcing layer covering an outer periphery of the liner, wherein
  the reinforcing layer includes:
    at least one first fiber layer including a first reinforced section provided on an outer periphery of the body part, the first reinforced section being formed by performing braid winding, the braid winding including winding fibers in such a manner that the fibers are interlaced with each other; and
    at least one second fiber layer including a second reinforced section provided on the outer periphery of the body part, the second reinforced section being formed by performing helical winding, the helical winding including winding fibers at a predetermined angle relative to a center axis of the liner,
  an outermost layer of the reinforcing layer is one of the at least one first fiber layers,
  an innermost layer of the reinforcing layer is one of the at least one first fiber layers,
  each of the first fiber layer includes the first reinforced section on the outer periphery of the body part and on the outer periphery of each dome part,
  each of the second fiber layer includes the second reinforced section on the outer periphery of the body part and the first reinforced section on the outer periphery of each dome part, and
  the reinforcing layer includes:
    a first continuously stacked section with a plurality of the first fiber layers stacked continuously; and
    a second continuously stacked section with a plurality of the second fiber layers stacked continuously.

2. The gas tank according to claim 1, wherein
the reinforcing layer includes an alternately stacked section with the first fiber layer and the second fiber layer stacked alternately.

3. The gas tank according to claim 1, wherein
the first continuously stacked section is arranged on an inner layer side relative to the second continuously stacked section in the reinforcing layer.

4. The gas tank according to claim 1, wherein
a total value of the thicknesses of the second fiber layers is equal to or less than five millimeters.

5. The gas tank according to claim 1, wherein
the number of the first fiber layers is larger than that of the second fiber layers.

6. A gas tank comprising:
  a liner including a cylindrical body part and a pair of dome parts, wherein each dome part is arranged at each of opposite ends of the body part; and
  a reinforcing layer covering an outer periphery of the liner, wherein
  the reinforcing layer includes:
    at least one first fiber layer including a first reinforced section provided on an outer periphery of the body part, the first reinforced section being formed by performing braid winding, the braid winding including winding fibers in such a manner that the fibers are interlaced with each other; and
    at least one second fiber layer including a second reinforced section provided on the outer periphery of the body part, the second reinforced section being formed by performing helical winding, the helical winding including winding fibers at a predetermined angle relative to a center axis of the liner wherein
  an outermost layer of the reinforcing layer is one of the at least one first fiber layers, an innermost layer of the reinforcing layer is one of the at least one first fiber layers,
  each of the first fiber layer includes the first reinforced section on the outer periphery of the body part and on the outer periphery of each dome part,
  each of the second fiber layer includes the second reinforced section on the outer periphery of the body part and the first reinforced section on the outer periphery of each dome part, and
  the number of the first fiber layers incorporated in an intermediate position of the reinforcing layer and on an inner layer side relative to the intermediate position is greater than that of the first fiber layers incorporated on an outer layer side relative to the intermediate position.

7. A method of manufacturing a gas tank comprising:
  preparing a liner including a cylindrical body part and a pair of dome parts, wherein each dome part is arranged at each of opposite ends of the body part; and
  forming a base including a fiber layer provided on an outer periphery of the liner, wherein
  the step of forming the base includes:
    forming at least one first fiber layer, including a first reinforced section provided on an outer periphery of the body part, the first reinforced section being formed by performing braid winding, the braid winding including winding fibers in such a manner that the fibers are interlaced with each other; and
    forming at least one second fiber layer including a second reinforced section provided on the outer periphery of the body part, the second reinforced section being formed by performing helical winding, the helical winding including winding fibers at a predetermined angle relative to a center axis of the liner,
  an outermost layer of the reinforcing layer is one of the at least one first fiber layers,
  an innermost layer of the reinforcing layer is one of the at least one first fiber layers,
  each of the first fiber layer includes the first reinforced section on the outer periphery of the body part and on the outer periphery of each dome part,
  each of the second fiber layer includes the second reinforced section on the outer periphery of the body part and the first reinforced section on the outer periphery of each dome part, and
  the reinforcing layer includes:
    a first continuously stacked section with a plurality of the first fiber layers stacked continuously; and
    a second continuously stacked section with a plurality of the second fiber layers stacked continuously.

8. The method of manufacturing the gas tank according to claim 7, further comprising:
placing the formed base inside a mold and closing the mold; and
filling the closed mold with a resin material to impregnate the resin material into the fiber layer of the base.

9. A method of manufacturing a gas tank comprising:
preparing a liner including a cylindrical body part and a pair of dome parts, wherein each dome part is arranged at each of opposite ends of the body part; and
forming a base including a fiber layer provided on an outer periphery of the liner, wherein the step of forming the base includes:
forming at least one first fiber layer, including a first reinforced section provided on an outer periphery of the body part, the first reinforced section being formed by performing braid winding, the braid winding including winding fibers in such a manner that the fibers are interlaced with each other; and
forming at least one second fiber layer including a second reinforced section provided on the outer periphery of the body part, the second reinforced section being formed by performing helical winding, the helical winding including winding fibers at a predetermined angle relative to a center axis of the liner,
an outermost layer of the reinforcing layer is one of the at least one first fiber layers,
an innermost layer of the reinforcing layer is one of the at least one first fiber layers, and
the number of the first fiber layers incorporated in an intermediate position of the reinforcing layer and on an inner layer side relative to the intermediate position is greater than that of the first fiber layers incorporated on an outer layer side relative to the intermediate position.

* * * * *